United States Patent [19]
Gaertner et al.

[11] Patent Number: 5,390,329
[45] Date of Patent: Feb. 14, 1995

[54] RESPONDING TO SERVICE REQUESTS USING MINIMAL SYSTEM-SIDE CONTEXT IN A MULTIPROCESSOR ENVIRONMENT

[75] Inventors: Gregory G. Gaertner; Diane M. Wengelski; Keith J. Thompson, all of Eau Claire, Wis.

[73] Assignee: Cray Research, Inc., Eagan, Mo.

[21] Appl. No.: 277,776

[22] Filed: Jul. 20, 1994

Related U.S. Application Data

[63] Continuation of Ser. No. 106,967, Aug. 16, 1993, abandoned, which is a continuation of Ser. No. 979,352, Nov. 20, 1992, abandoned, which is a continuation of Ser. No. 571,953, Aug. 23, 1990, abandoned, which is a continuation-in-part of Ser. No. 537,466, Jun. 11, 1990, Pat. No. 5,179,702.

[51] Int. Cl.⁶ .............................................. G06F 9/46
[52] U.S. Cl. ..................... 395/650; 364/DIG. 1; 364/230; 364/230.1; 364/230.2; 364/230.3; 364/230.4
[58] Field of Search ................ 364/DIG. 1 MS File, 364/DIG. 2 MS File; 395/200, 275, 375, 400, 425, 650, 700, 800

[56] References Cited

U.S. PATENT DOCUMENTS

| | | | |
|---|---|---|---|
| 3,614,742 | 7/1968 | Watson | 395/325 |
| 4,153,934 | 5/1979 | Sato | 395/650 |
| 4,849,934 | 7/1989 | Yokoyama et al. | 365/153 |
| 4,964,040 | 10/1990 | Wilcox | 395/425 |
| 5,008,812 | 4/1991 | Bhandarkar et al. | 395/375 |

*Primary Examiner*—Robert B. Harrell
*Attorney, Agent, or Firm*—Schwegman, Lundberg & Woessner

[57] ABSTRACT

A method of providing fast and efficient kernel functions including those usually performed by kernel daemons and other kernel processes such as those which service interrupts. The method consists of using minimal-context processes that carry only the system-related information needed to do the work they are created to do. Compared to the full-context processes presently used to do kernel functions, minimal-context processes are created quickly and switch economically. If associated with a work queue, the minimal-context process performs a series of tasks within a single active session. If no queue is used, a minimal-context process can wake up and accomplish a single task rapidly. The method generally relates to kernel-based operating systems.

9 Claims, 7 Drawing Sheets

```
INEWPROC(CPU_MASK, PRI)
INT CPU_MASK;
INT PRI;
{
UPDATE SYSTEM COUNTER OF IPROCS IN EXISTENCE
ALLOCATE IPROC ENTRY AND ASSIGN A PID
INITIALIZE IPROC ENTRY (STAT, TYPE, FLAGS, CPUMASK, ETC.)
INITIALIZE SEMAPHORES FOR THIS IPROC
ALLOCATE A CONTROL BLOCK FOR SAVING THIS IPROC'S CONTROL
REGISTERS (NOTE: A NORMAL PROCESS SAVES THESE IN ITS USER
AREA)
INITIALIZE CONTROL BLOCK WITH CURRENT CONTENTS OF THE
CONTROL REGISTERS

SWITCH ( IPROCDUP(CP,PP) ) {
CASE 0:
        SUCCESSFUL COPY-CONTINUE SETTING UP CHILD
CASE -1:
        COPY FAILED-BACK OUT AND RETURN ERROR
CASE 1:
        CHILD RESUMES HERE-RETURN SUCCESS
}
INITIALIZE CLASS
INITIALIZE CLASS SPECIFIC FUNCTION VECTOR
SET STATUS TO RUNNABLE
CALL CLASS SPECIFIC QUEUEING FUNCTION TO QUEUE CHILD ON
RUNQ
RETURN SUCCESS
}
IPROCDUP(CP,PP)
IPROC_T *CP;
IPROC_T *PP;
{
ALLOCATE SYSTEM AND KERNEL SAVE AREAS
ALLOCATE KERNEL STACK
IF (IN SYSTEM MODE) {
    COPY PARENT'S KERNEL STACK TO CHILD'S KERNEL STACK
}ELSE {
    COPY PARENT'S INTERRUPT STACK TO CHILD'S KERNEL STACK
}CLEAR KR[0]/* CURRENT USER AREA FOR THIS CPU, IPROCS DO NOT
HAVE */
SET KR[1] TO POINT TO THIS IPROC/* CURRENT PROCESS FOR THIS
CPU*/

IF (SAVE ( CP-<P_SSAV))
{
CHILD RESUMES HERE-RETURN TO INEWPROC
}
PARENT RESUMES HERE - RETURN TO INEWPROC
```

Fig. 7

RESPONDING TO SERVICE REQUESTS USING MINIMAL SYSTEM-SIDE CONTEXT IN A MULTIPROCESSOR ENVIRONMENT

This is a continuation, of application Ser. No. 08/106,967, now abandoned, filed on Aug. 16, 1993, entitled RESPONDING TO SERVICE REQUESTS USING MINIMAL SYSTEM-SIDE CONTEXT IN A MULTIPROCESSOR ENVIRONMENT, which is a continuation application of Ser. No. 07/979,352, filed on Nov. 20, 1992, now abandoned, which is a continuation application of Ser. No. 07/571,953, filed on Aug. 23, 1990, now abandoned, which is a continuation-in-part application of Ser. No. 07/537,466, filed on Jun. 11, 1990, issued as U.S. Pat. No. 5,179,702, on Mar. 23, 1993. This application is a continuation-in-part of an application filed Jun. 11, 1990, titled INTEGRATED SOFTWARE ARCHITECTURE FOR A HIGHLY PARALLEL MULTIPROCESSOR SYSTEM, [Ser. No. 07/537,669] which issued as U.S. Pat. No. 5,179,702 on Jan. 12, 1993, and is assigned to the assignee of the present invention, the disclosure of which is hereby incorporated by reference in the present application. The application is also related to [co-pending] an application tiled Jun. 11, 1990, now titled DEDICATED CENTRALIZED SIGNALING MECHANISM FOR SELECTIVELY SIGNALING DEVICES IN A MULTIPROCESSOR SYSTEM, [Ser. No. 07/536,192] which issued as U.S. Pat. No. 5,239,629 on Aug. 24, 1993, and is assigned to the assignee of the present invention, the disclosure of which is hereby incorporated by reference in the present application. This application is related to [co-pending applications files concurrently herewith] an application filed Aug. 23, 1990, titled SCHEDULING METHOD FOR A MULTIPROCESSOR OPERATING SYSTEM [and], Ser. No. 8/072,655 which is a FWC continuation of Ser. No. 07/571,951, which 07/571,952 is now abandoned, and is assigned to the assignee of the present invention, the disclosure of which is hereby incorporated by reference in the present application. This application is also related to an application filed Aug. 23, 1990, titled METHOD OF EFFICIENT COMMUNICATION BETWEEN COPROCESSORS OF UNEQUAL SPEED, which issued as U.S. Pat. No. 5,202,988 on Apr. 13, 1993, [which are] and is assigned to the assignee of the present invention, the disclosure[s] of which is hereby incorporated by reference in the present application.

TECHNICAL FIELD

The present invention relates generally to kernel-based operating systems. More particularly, the present invention relates to a new minimal-context process entity able to perform faster and more efficiently all system-side tasks associated with Unix[1] kernel daemons and other kernel functions, however the present invention is not limited to use in a Unix-type environment.

BACKGROUND ART

This invention is a new programmable minimal-context process able to perform any kernel function, including the efficient servicing of system interrupts and other events. This background section discusses process context and servicing of interrupts as implemented in prior art kernel-based operating systems. More information about these topics is available in chapters 6 and 12 of "The Design of the UNIX Operating System," written by Maurice J. Bach, and published in 1986 by Prentice-Hall, Inc.

In current kernel-based systems, all processes are created equal. That is, every process is assigned the same background elements of context when it is created. Process context has two components, user-side context and system-side context.

User-side context consists of the process instructions, its data, its stack, any shared data, and the contents of any user-related registers. The system-side context consists of the process table entry containing state, accounting, scheduling and general control information, internal process control information, the kernel stack, and the contents of system-related registers.

The kernel must save the register portion of the context of a process whenever a process is switched out of execution, and restore that portion of the context prior to the processor's resuming execution. Switching register contexts can take a substantial number of processor cycles depending upon how many registers are implemented in a system architecture. Scalar/vector processors having several multifunction functional units usually require significant numbers of scalar registers, large capacity vector registers, and storage registers as do systems in which data is frequently shared. These cycles impact system performance because register context switches are done each time the system receives an interrupt, the kernel does a process switch, or when a user makes a system call. To switch one process out and another process in requires the current process's register context to be saved, and the next process's register context to be restored. After that process executes, its register context will be saved and another process's context will be restored. When processes are interrupted, or system calls made, the user register context must be saved to allow the system to use the system registers. The user register context must then be restored prior to returning control of the processor to the user. When the processes involved in such switches are processes executing user programs, the overhead of context switching and creation is justified since user processes require all that context to do work. However, a significant number of processes do only system or kernel work. These kernel processes carry some amounts of unnecessary context, and therefore take longer to create and to switch than they actually need to take. There is a need in the prior art to develop a method by which kernel functions are performed more efficiently and consume only the processor resources absolutely required.

The servicing of system interrupts in prior art systems provides an example of a common kernel function in which a quicker and more efficient method is desired. In these systems the kernel does work resulting from the arrival of an interrupt at a particular processor by stopping the process currently executing on the processor. The work is done in the context of the currently executing process.

Process A is running when an interrupt occurs, for example, an I/O interrupt confirms that a disk transfer has been made to memory for Process X. Process A is interrupted because of process X. Interrupt hardware transfers control to the zero level interrupt handling routine.

On the software side, the interrupt handler first saves the register context of process A and sets a pointer to process A's process number to start it up again later.

The process A information originally stored in the stack may be moved to a temporary stack, although many prior art implementations use the kernel stack.

The interrupt handler now wakes up Process X. Process X has been blocked from any other activity while it has been waiting for the interrupt handler to respond. The wake up call unblocks Process X and queues it on the run queue. If there is now a higher priority process on the run queue, the interrupt handler being run by Process A calls the integrated dispatcher and the highest priority process is chosen to run. This process may be Process X or some other process that has been queued at a higher priority. If a higher priority process does not exist can the run queue, the interrupt handler does not invoke the integrated dispatcher. Instead, Process A's context is restored and it resumes execution.

The performance of kernel functions such as interrupt handling in prior art systems has several basic problems. A major problem is the amount of system overhead required to perform kernel functions. Context switches and process start-up times consume processor cycles and affect the overall performance of the processor. Efficiency is reduced because of overhead associated with processes. In a classical Unix implementation, only one kind of process entity can be created or processed by only one kind of creating entity, the fork system call. As a result, the kernel processes contain more context information than is actually required. The user-side context of kernel processes (i.e., user block and various process table fields) is ignored by the system and is not used. However, even though it is unused, user-side context does have overhead associated with memory and switching because the system automatically processes this context and unnecessarily consumes resources to do so.

Another problem with existing implementations is that when an interrupt occurs, the processor which receives the interrupt stops processing to handle the interrupt, regardless of what the processor was doing. This can result in delaying a high priority task by making the processor service a lower priority interrupt. Prior art methods cannot prevent lower priority processes from interrupting higher priority processes and, in fact, it is common for high priority processes to be routinely interrupted by lower priority processes.

Forcing the currently executing process to handle interrupts creates problems in resource accounting. The accounting of processor time for kernel functions in prior art methods is not accurate since the currently running process is charged for the processor time while it services another process's interrupt. In the example above, process A will be charged for the processor time required to service the interrupt for process X.

Additionally, the prior art provides a method designed to be implemented on single processor systems. Deficiencies in the prior art are apparent when a kernel function such as interrupt handling is implemented on multiprocessor systems. In a single processor system, the interrupt is handled by default on the only processor. In multiprocessor systems, it may be desirable to service the interrupt on a preferred processor, on one doing lower priority work, for example, or on an idle processor.

SUMMARY OF THE INVENTION

A process is generally defined as an entity that the operating system can schedule to run. The operating system has knowledge of a process through entries in various internal data structures. The present invention introduces a new type of process called an iproc. An iproc is a minimal-context process designed to efficiently execute kernel tasks. Iprocs provide an efficient means of doing work created by an interrupt or other system event into a processor available to do the work. An iproc can be created at the time of the event or prior to the event. The inewproc procedure is called to create a minimal-context iproc in the same way the fork system call is called to create a full-context process. An advantage of the present invention is that because an iproc carries only system context, an iproc requires minimal context allocation/restoration as it is created/scheduled, and is therefore quickly ready to execute.

An iproc is capable of doing all ranges of kernel functions from causing a message to be printed on a console screen to servicing r/O and clock interrupts. An iproc is not created by fork, but instead is created by inewproc. Iprocs can be created prior to an event and put to sleep until the event actually occurs, or they can be created dynamically as needed. As it is created, an iproc is assigned only a small amount of system-side context including its iproc table entry, which is a minimized subset of an iproc entry. Iprocs are not allocated a user area since they never execute user code. When requested on-demand by a process, an iproc is created and switched into execution more quickly than a process created by fork. An iproc also terminates quicker than a fork-created process. An iproc exits quickly since it does not need to do all the normal exit processing, such as closing open files, that a full-context process has to do.

Carrying a minimal amount of system-only context is one of the iprocs most advantageous features, and enables an iproc to switch quickly and with very low overhead. This efficiency is realized because the significant amounts of user register context does not exist for an iproc, and is therefore not saved and restored. An advantage of the present invention is that iprocs use fewer system resources to accomplish the same work as prior art kernel processes.

Like other processes, an iproc is scheduled from the run queue. Iprocs may be scheduled by traditional means such as sleep, wake up calls, or their equivalent, and/or via a wake up queue on a multiprocessor computer system as described in greater detail in the previously identified co-pending application titled METHOD OF EFFICIENT COMMUNICATION BETWEEN COPROCESSORS OF UNEQUAL SPEEDS.

Although iprocs can do any type of kernel processing and are not limited to servicing interrupts, a major advantage of iprocs is that they can be used to minimize the impact of interrupts received by a processor. This is done by enabling the process in execution when an interrupt occurs to acknowledge the interrupt and to place an iproc on the run queue to do the actual servicing of the interrupt. That is, the present invention enables the executing process to defer the interrupt to another process, an iproc, that may execute on a different processor or that could execute at a later time on the same processor. This is accomplished by implementing a zero level interrupt routine which the interrupted processor executes when it receives the interrupt. The zero level interrupt routine does not service the interrupt. The interrupted processor jumps from the process it is executing to the zero level interrupt routine and executes the code. The zero level interrupt routine includes code to determine the cause of the interrupt and to cause the appropriate iproc to be scheduled. Scheduling the iproc is done either by waking a daemon iproc that was created earlier or by creating a new iproc. The routines for waking or creating an iproc place the iproc onto the run queue so that the integrated dispatcher can schedule it, a process that is described in greater detail in the previously identified co-pending application titled SCHEDULING METHOD FOR A MULTIPROCESSING OPERATING SYSTEM. The executing process may not be switched out; it is interrupted for a short period and then resumes execution if it is still at a higher priority than other processes on the run queue. This method prevents a low priority interrupt from causing a high priority process to be switched out of execution. Because there is only a minimal context switch when an interrupt is acknowledged, the impact of the interrupt, regardless of its priority, is minimal for the interrupted process. The zero level interrupt routine only saves those few registers that it knows it will use rather than saving the process's entire context. If the current process is resumed, only a minimal context restoration is necessary. The full-context save is delayed until this process is naturally switched out.

Another advantage of the method of the present invention is that it enables kernel functions that service external and internal events to be scheduled into preferred processors in a multiprocessor system. A preferred processor is one available to do work rather than one executing a process, or one that is executing a low priority process. This allows one process to queue an iproc on the run queue to do some kernel task and then to signal the preferred processor that there is now a more important process for it to run. The signal causes the preferred processor to run the integrated dispatcher if that iproc is at a higher priority than the currently executing process. The integrated dispatcher switches out the currently executing process and runs the iproc. The signaling method is described in greater detail in the previously identified, co-pending application titled SIGNALING MECHANISM FOR A MULTIPROCESSOR SYSTEM. Although not limited to use with interrupts, this facet of the present invention enables the development of a real-time Unix-based operating system in which the interrupt can be serviced in a determinant amount of time. This is accomplished by enhancing the zero level interrupt routine with the intelligence to signal a preferred processor after queuing onto the run queue an iproc that will service the interrupt.

Another advantage of the present invention is that the accounting of kernel functions is kept separate from user functions and therefore the resources used by a process can be assigned to the correct process. That is, users are not charged for the processor time spent servicing interrupts.

Although in the present invention the minimal-context process and zero level interrupt routine are implemented in the operating system for a multiprocessor computer, they are not limited to this implementation. The method of the present invention can be implemented in other functions and utilities that require servicing of kernel functions in a multiprocessor or a uniprocessor computer system.

Those having normal skill in the art will recognize the foregoing and other objects, features, advantages and applications of the present invention from the following more detailed description of the preferred embodiments as illustrated in the accompanying drawings.

DESCRIPTION OF THE PREFERRED EMBODIMENT

The preferred embodiment of the present invention is particularly useful in the servicing of interrupts and other system events in a kernel-based operating system for a multiprocessor system.

An iproc is a minimal-context process designed to efficiently execute kernel tasks. Since it only executes kernel code, it does not need user-side context and is therefore more efficient to create and switch than is a full-context kernel process. Carrying minimal context enables the iproc to complete kernel functions such as post-interrupt handling more efficiently than full-context processes are able to do.

The method of the present invention differs from prior art interrupt handling in which the interrupt is serviced in the processor that gets the interrupt. In the method of the present invention, an interrupt does not have to be handled by the process which receives the interrupt. Instead, the process executes a special zero level interrupt routine that schedules an iproc to process and handle the interrupt. In the preferred embodiment, the address of this zero level interrupt routine is contained in the interrupt address (IAD) register. When an interrupt occurs, execution continues at the address given in the IAD register.

It is the responsibility of the module specified by the address in the processor's IAD control register to determine the source of the interrupt and respond appropriately. This responsibility includes saving whatever state is necessary and scheduling the appropriate iproc for dispatch. This state is a minimal subset of the registers that the zero level interrupt routine itself knows it will use. The full context of the current process is not saved until it is switched out. Scheduling an iproc requires either waking up a kernel daemon to handle the interrupt (an example is the clock daemon that handles all clock interrupts) or creating a new iproc to handle the interrupt. Processing mechanisms support both event-driven and polling-derived interrupts. This method allows high priority processes to continue execution. For example, if a clock interrupt is caught, the zero level interrupt routine saves a minimal context and makes runnable a daemon created earlier to specifically handle such interrupts. The zero level interrupt routine restores the minimal context it had saved and the accepting process continues to execute. The iproc servicing the clock interrupt is on the run queue and will execute when some processor runs the integrated dispatcher routine.

Figure 1:
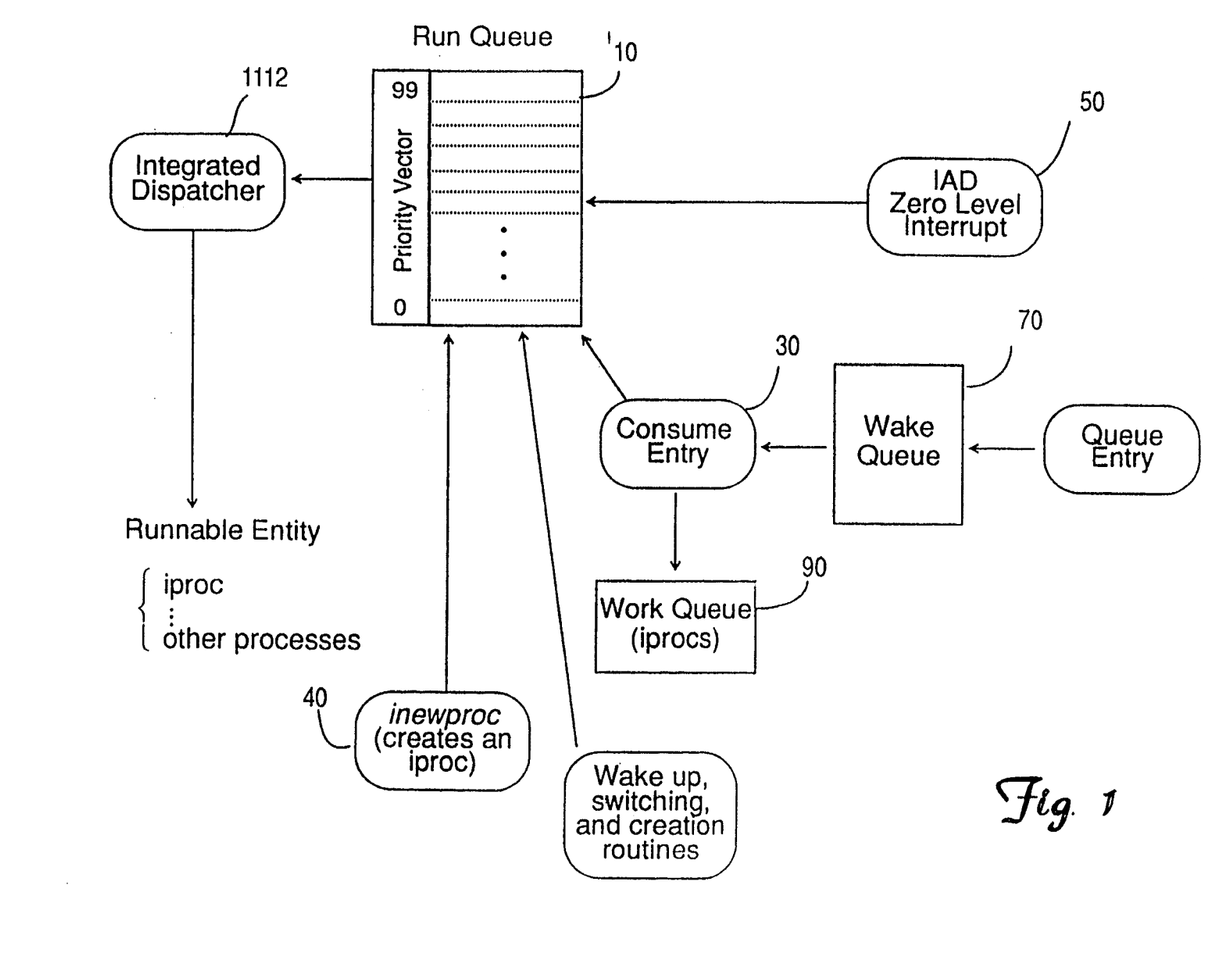
FIG. 1 is a schematic diagram showing the functional environment of the iproc.

A functional environment for the minimal-context iproc is shown in FIG. 1. The routine that creates an iproc is shown as inewproc 40. The interrupt information contained in the IAD zero level interrupt code 50 calls inewproc 40 to create an iproc or wakes a specific iproc. The newly-spawned or woken up iproc is moved to the run queue 10 by the inewproc routine 40 or by the wake-up call. The processor that runs the integrated dispatcher routine 1112 when this iproc is the highest priority process in the run queue 10 will run the iproc and the interrupt will be serviced. After the iproc completes the interrupt code, it either exits or goes to sleep. Kernel daemons go to sleep to wait for their designated type of interrupt. Iprocs that were created by the zero level interrupt routine exit (are discarded) when they complete their task(s). If associated with a work queue 90, the minimal-context iproc performs the series of tasks on its work queue 90 within a single waking session. This allows a single consumer wake up to service multiple wake queue producer requests.

When the zero level interrupt handler is entered, a minimal context must be saved to allow the handler to execute without overwriting part of the interrupted process context. This minimal context on a clustered, multiprocessor type of system will be typically employ about eight scalar (S) registers. These S registers must be saved because they will be used for intermediate values during execution. That is, address calculations will use the S registers, and if any memory locations are to be examined by the handler, they must first be loaded into S registers.

If the handler decides that there exists a process of higher priority to run, the context of the interrupted process must be saved. If the interrupted process is an iproc, that context will consist of the complete S register set. The V (vector) and L (local) register sets need not be saved since they are not part of the system side context. If the interrupted process is a user process, the full context must be saved. This includes the S, V, and L registers.

The flexibility and variable uses inherent in the method of the present invention are shown in FIGS. 2 through 6.

Figure 2:
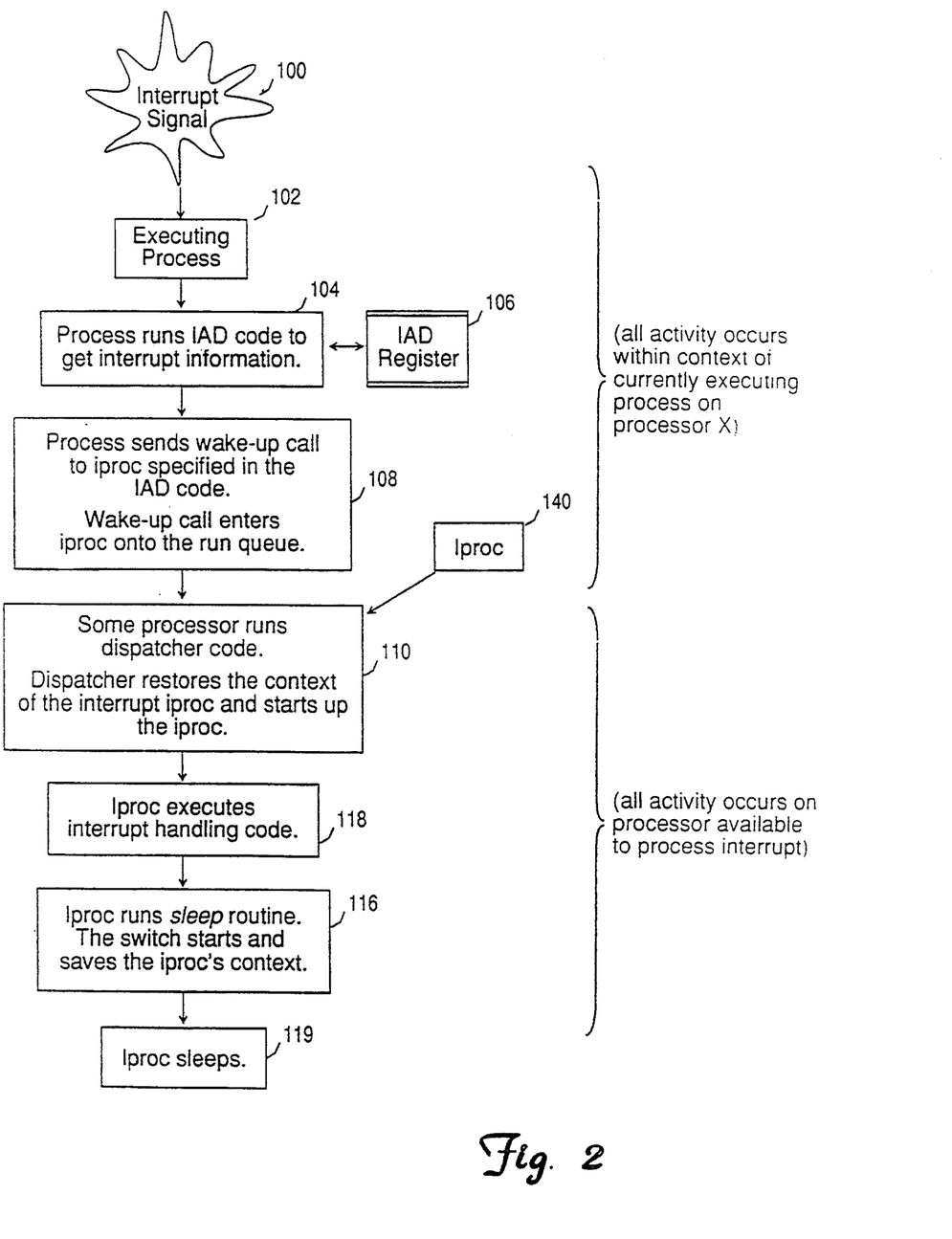
FIG. 2 is a process diagram showing how an I/O interrupt is serviced using an existing iproc.

FIG. 2 shows the process of servicing an interrupt using a sleeping iproc. After the interrupt signal 100 is received by processor X, the processor jumps to the address in the IAD control register 106 so that the currently executing process 102 stops executing its code and instead executes the zero level interrupt routine 104 that is at the address contained in the IAD register 106 to find out where to defer the interrupt. The executing process 102 issues a wake-up call 108 for the specified iproc 140, and resumes running its own program. The wake-up call enters the iproc 140 onto the run queue 10. Note that the executing process 102 only acknowledges and defers the interrupt; it is not switched out. Only a minimal-context switch to run the zero level interrupt routine is necessary. Iproc 140 is a programmed process given the intelligence to handle the type of interrupt that have occurred. As a kernel daemon, it is frequently called and goes to sleep after interrupt processing is completed.

The following activity takes place on the processor that is going to actually service the interrupt. The iproc 140 remains on the run queue until some processor runs the integrated dispatcher routine 1112 (FIG. 1) and takes the iproc off the run queue 10. The integrated dispatcher 1112 (FIG. 1) restores the iproc's 140 context and lets it begin executing. The iproc executes its interrupt handling code 118 and then goes on to run the sleep routine 116 in which its context is saved and it is switched out. At the end of this process the iproc is sleeping 119.

Figure 3:
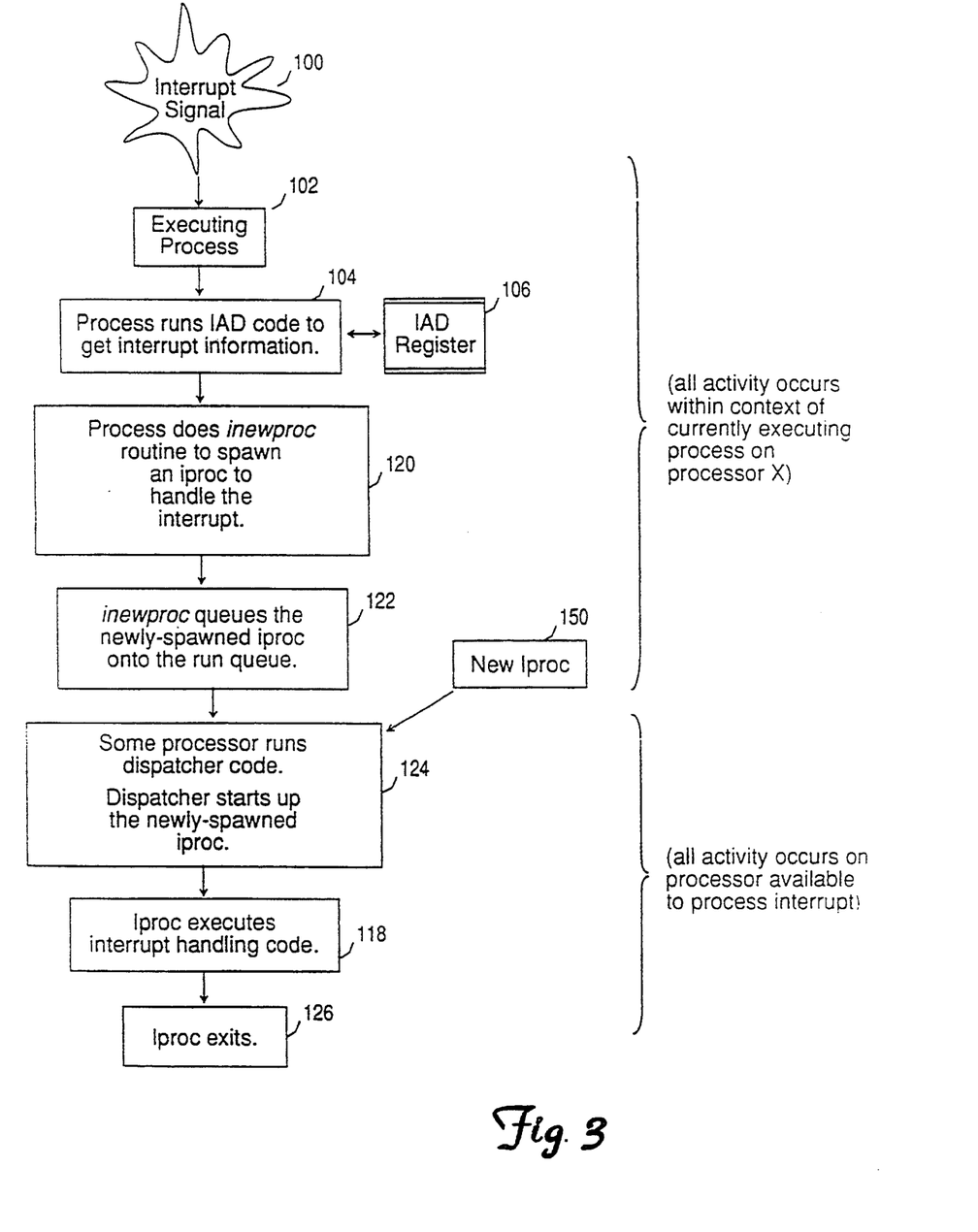
FIG. 3 is a process diagram showing how an I/O interrupt is serviced using an iproc created for this interrupt.

FIG. 3 shows the activity that occurs when the interrupt is serviced by an iproc created on demand. After the interrupt signal 100 is received by processor X executing 102, the processor jumps to the address in the IAD control register 106 so that the currently executing process 102 stops executing its code and instead executes the zero level interrupt code 104 to find out where to defer the interrupt. In this example, the zero level interrupt routine has been enhanced with the intelligence to call the inewproc routine 40 (FIG. 1) to create an iproc to, handle tiffs interrupt type 120. The inewproc routine 40 (FIG. 1) queues 122 the newly spawned iproc 114 onto the run queue 10.

The following activity takes place on the processor that is going to actually service the interrupt. Some processor runs the integrated dispatcher routine 1112 (FIG.1) and takes the newly spawned iproc 150 off the run queue 10. The dispatcher 1112 (FIG. 1) loads the iproc's 150 context and lets it begin executing 124. The iproc 150 executes its interrupt handling code 118 and then runs the exit routine. This terminates the iproc 150.

The minimized context of the present invention is the key element in the example shown in FIG. 3. Since the iproc creations and exit routines are minimal subsets of their full-context counterparts, an iproc can be spawned to service an interrupt in an acceptable period of time.

Figure 4:
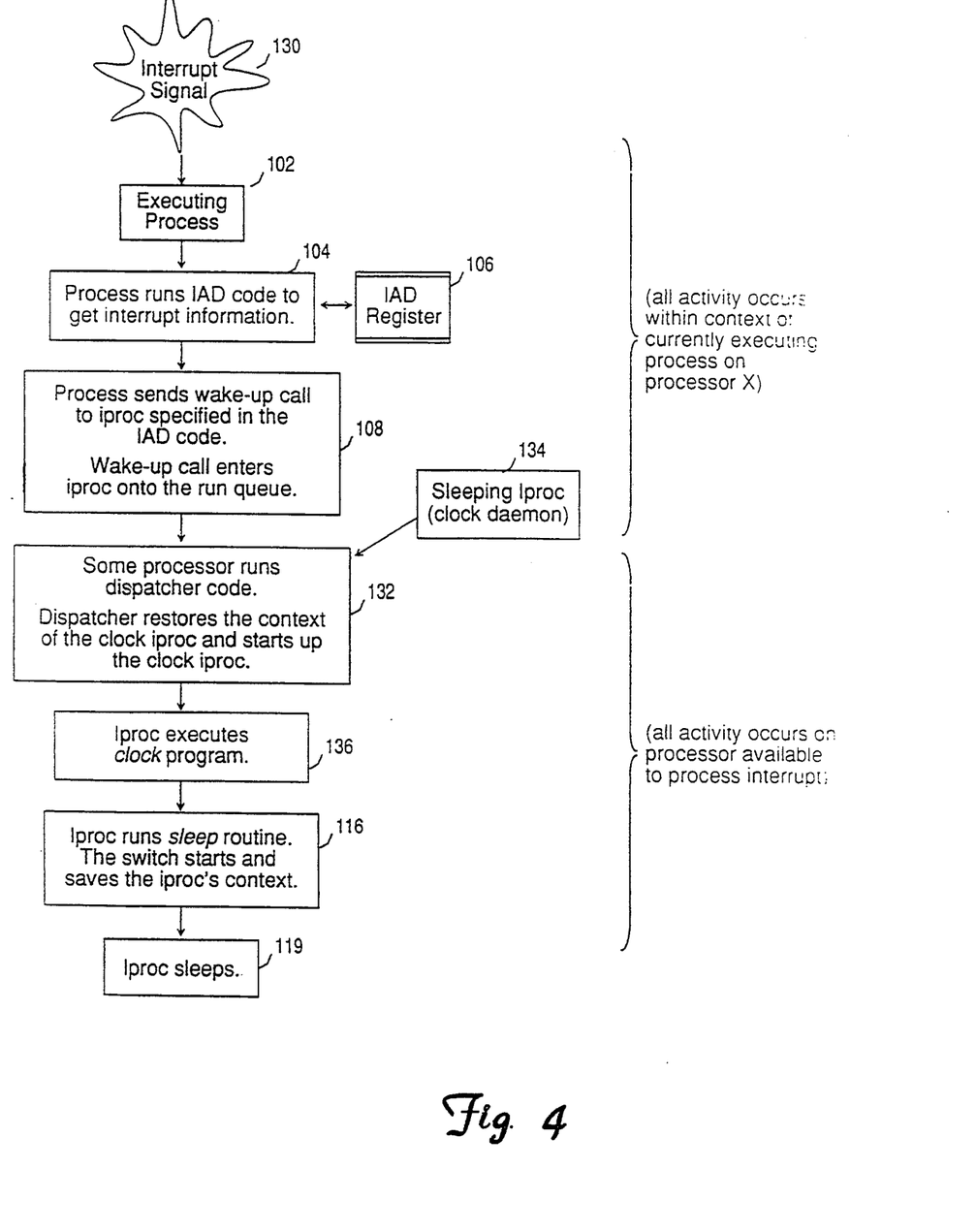
FIG. 4 is a process diagram showing how a clock interrupt is serviced using a programmed iproc.

FIG. 4 is a process diagram that shows hew a clock interrupt is serviced by an iproc functioning as a clock daemon. Iproc 134 is a programmed process given the intelligence to handle clock interrupts. As a kernel daemon, it is frequently called and goes to sleep after each clock interrupt is completed. After the interrupt signal 130 is received by processor X, the processor jumps to the address in the IAD control register 106 so that the currently executing process 102 stops executing its code and instead executes the zero level interrupt code 104 to find out where to defer the interrupt. The executing process 102 sends a wake-up call 108 to the specified iproc 134, and resumes running its own program. Not e that the executing process 102 only acknowledges and defers the interrupt; it may not be switched out. The wake-up call enters the iproc 134 onto the run queue 10 (FIG. 1).

The following activity takes place on the processor that is going to actually service the interrupt. The iproc 134 remains on the run queue until some processor runs the integrated dispatcher routine 1112 (FIG. 1) and takes the iproc off the run queue 10. The dispatcher 1112 (FIG. 1) restores the sleeping iproc 134 context and lets it begin executing 132. The iproc 134 executes its clock program 136. Once the clock interrupt processing is completed, the iproc 134 runs the sleep routine 116 in which its context is saved and it is switched out. At the end of this process the iproc 134 is sleeping 119.

Figure 5:
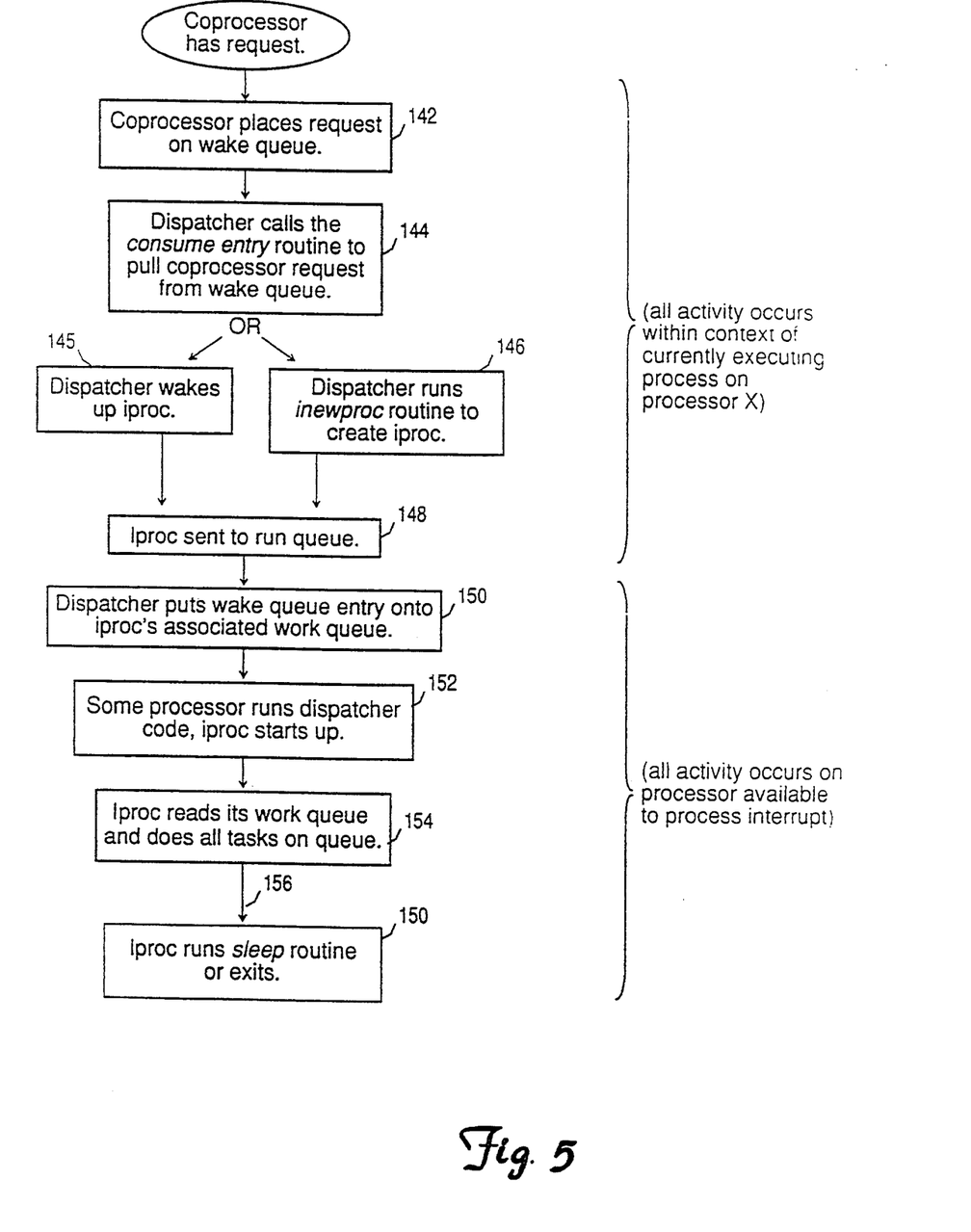
FIG. 5 is a process diagram showing how an iproc is used to perform a non-interrupt driven coprocessor request.

FIG. 5 is a process diagram showing how an iproc is used to perform a non-interrupt driven request from an external coprocessor. A coprocessor request can range from post-interrupt processing to diagnostic integrity tests.

The coprocessor is able to make the request without using an interrupt by putting an entry onto the wake queue 142. The integrated dispatcher calls the consume entry routine 144 to pull the coprocessor's entry from the wake queue. At this point the integrated dispatcher either wakes a sleeping iproc 145 or runs the inewproc routine to spawn a new iproc 146. Either way, the iproc that will service the coprocessor's request is entered onto the run queue 148. If a work queue is associated with this wake queue, the dispatcher puts the wake queue entry onto the work queue 150. The processor that runs the dispatcher routine 152 when the iproc is the highest priority entry in the run queue will run the iproc. If a work queue has been established for this type of coprocessor request, the iproc removes its entries from the work queue 154 and performs all of the tasks on the queue. This is an efficient method of servicing kernel tasks because numerous wake queue requests can be serviced at a low overhead cost since, once an iproc runs, it services all requests on the work queue and avoids the usual wake up/create overhead per request. Once the tasks are completed 156, the iproc is programmed either to run the sleep routine or to exit 158.

Figure 6:
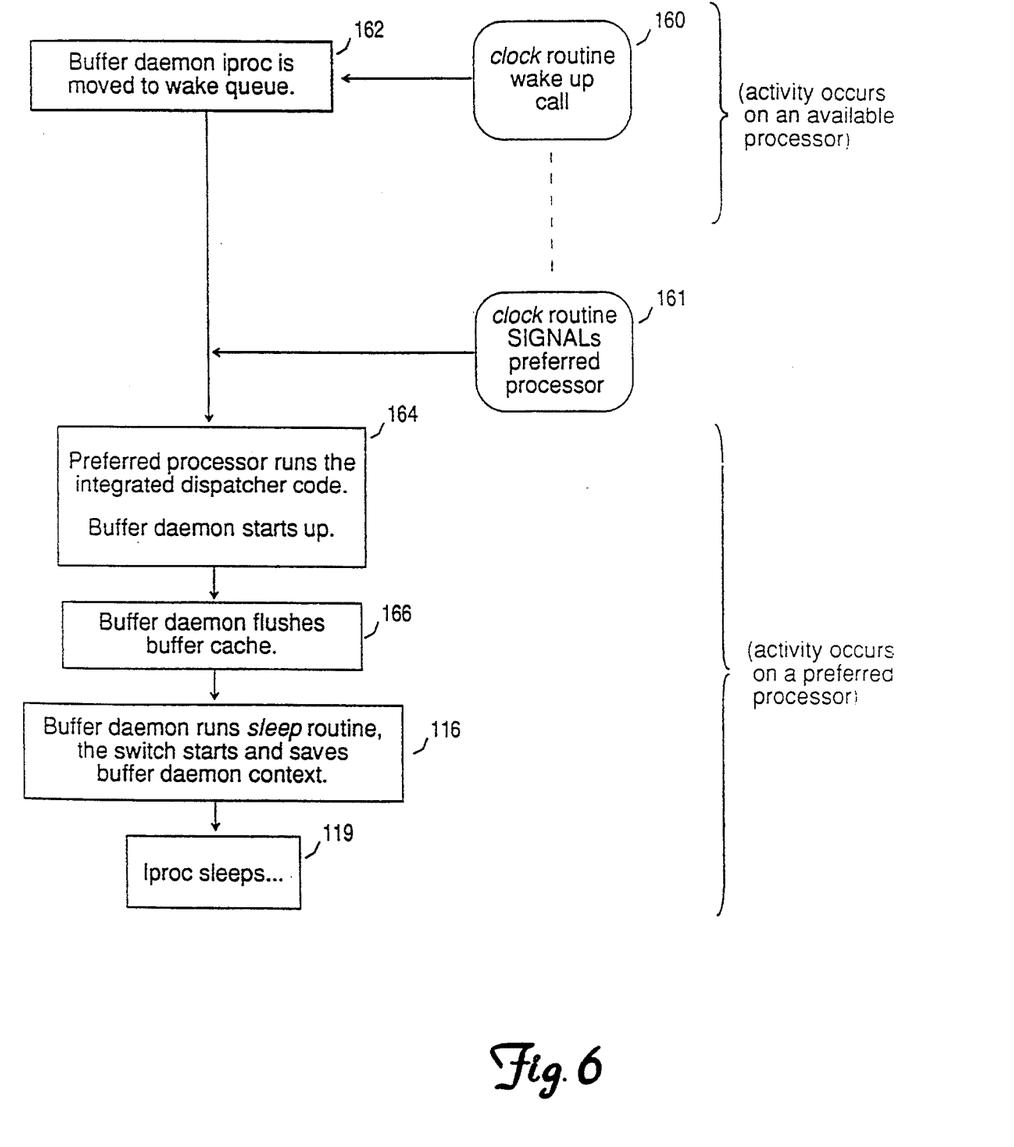
FIG. 6 is a process diagram showing how a buffer daemon iproc is used to perform a non-interrupt driven kernel function.

FIG. 6 is a process diagram showing how an iproc programmed to function as a buffer daemon iproc is used to perform a non-interrupt driven kernel function such as flushing the buffer cache. The iproc performs the kernel function while the clock routine signals a preferred processor to execute the iproc.

In this example, the clock routine 160 sends a wake up call to the iproc created earlier to function as a buffer daemon. The wake up moves the buffer daemon iproc to the run queue 162. Then the clock routine sends a signal to the preferred processor 161. The preferred processor runs the integrated dispatcher code. If the buffer daemon is the highest priority process on the queue, the dispatcher restores the buffer daemon iproc context and lets the daemon start executing 164. The buffer daemon executes its code and flushes the buffer cache 166. When it completes the flush, the buffer daemon goes on to run the sleep routine 116 in which its context is saved and it is switched out. At the end of this process the buffer daemon iproc is sleeping 119.

Figure 7:
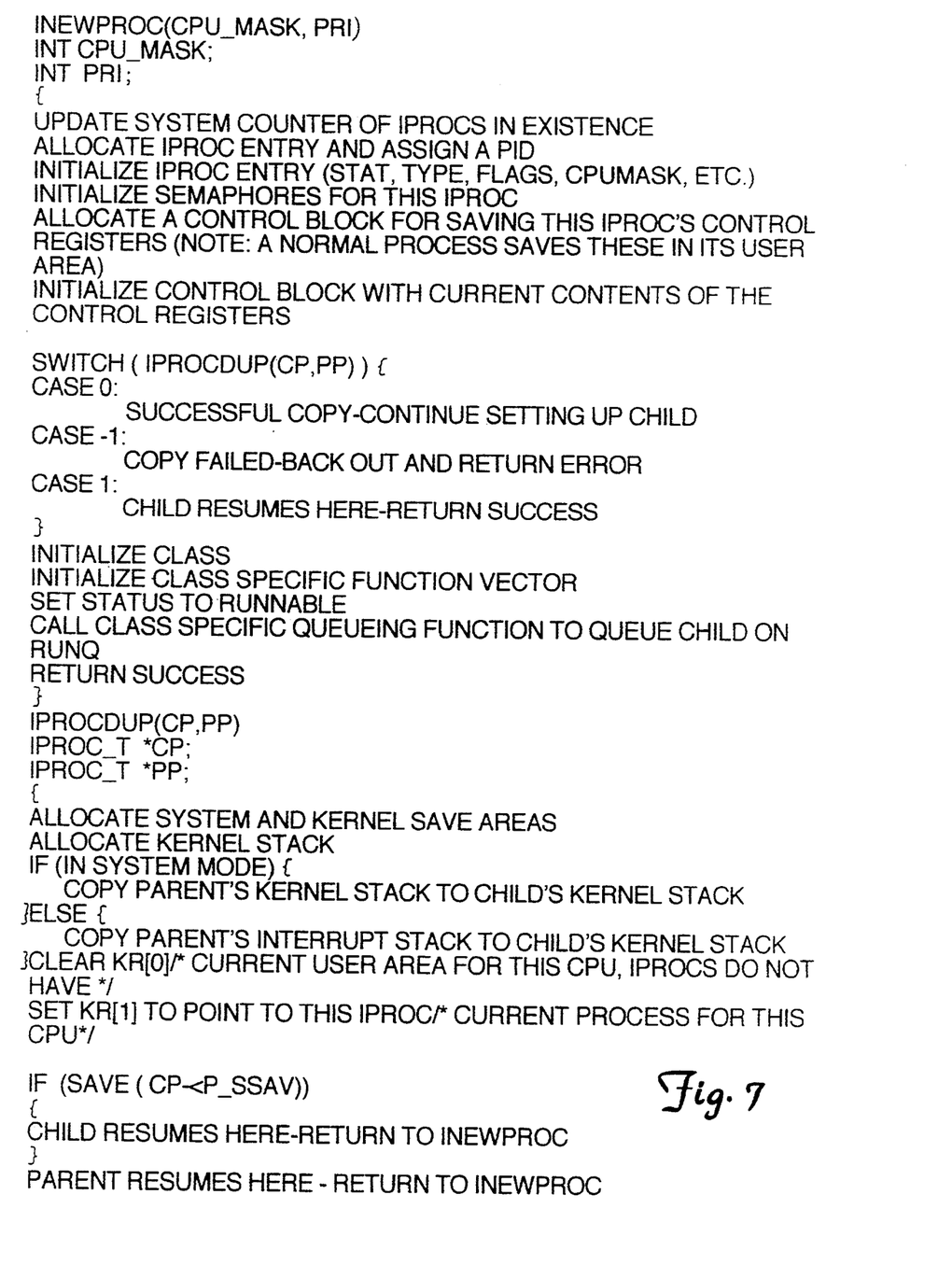
FIG. 7 is a listing of the pseudo code for the inewproc procedure.

FIG. 7 shows the pseudo code for the inewproc procedure that creates the minimal context processes called iprocs. The inewproc routine is a minimal subset of the inewproc routine called by the fork system call to create a full-context process. Specifically, the code in inewproc that allocates/initializes user context data structures does not exist in inewproc since iprocs do not have user-side context. The exit routine is similarly stripped to remove unnecessary processing such as closing files, deallocating the user area, and so on.

While the exemplary preferred embodiments of the present invention are described herein with particularity, those having normal skill in the art will recognize various changes, modifications, additions and applications other than those specifically mentioned herein without departing from the spirit of this invention.

We claim:

1. In a data processing and handling system having one or more processing units coupled to a multiplicity of sharable components, all operable in conjunction with both a system-side context and a user-side context, for performing data processing and handling tasks in response to service-requesting events which have priority level information associated therewith, and wherein the system has a temporary data storing means including a plurality of separately addressable data storage areas, a method for responding to occurrences of service-requesting events comprising the steps of:

designating one of the data storage areas as a zero level storage area having a higher priority level than all remaining data storage areas:

responding to an occurrence of a service-requesting event by moving service-handling program code having minimal system-side context to said zero level storage area, said minimal system-side context containing information identifying a task associated with said service-requesting event, as well as an assigned priority associated with said service-requesting event;

suspending a first process in a receiving processing unit whenever said zero level storage area is loaded:

preserving a minimal system-side context of said first suspended process which is less than an entire context of said suspended first process into said sharable system components in order that said receiving processing unit is ready to handle said minimum system-side context of said service-handling program code;

determining whether said priority level assigned to said service-requesting event is higher than a priority level assigned to said first suspended process;

saving said entire context of said first suspended process in order to commence processing of tasks of said service-requesting event in response to a result of said determining step indicating that said priority level assigned to said suspended processing is not higher than said priority level assigned to said service-requesting event; and placing a service request indicator in a storage area different from said zero level storage area in response to a result of said determining step indicating that said priority level assigned to said first suspended process is higher than said priority level assigned to said service-requesting event.

2. The method according to claim 1 including a further step of establishing a program for creating code for determining said minimal system-side context in response to an occurrence of said service-requesting event depending on which type of service-requesting event occurred.

3. The method in accordance with claim 2 which includes the steps of:

creating said minimal system-side context code prior to said occurrence of said service-requesting event; and storing said created minimal system-side context code.

said responding step including the step of retrieving said stored minimal system-side context code for moving to said zero level storage area.

4. The method according to claim 3, wherein said minimal system-side context code is an executable daemon.

5. The method in accordance with claim 1 wherein said suspending step includes the step of generating an acknowledgment signal to indicate that handling of the service requesting-event is initiated.

6. A method to process service requests in a data processing system including a plurality of general processing units comprising the steps of:

supplying a signal identifying a requested service to be processed;

suspending execution of a first program being executed on a receiving processing unit to which said identifying signal is supplied;

starting execution of a service process corresponding to said service request by said receiving processing unit;

transferring control of said execution of said service process to an available processing unit in said system that is executing a lower priority program;

resuming execution of said first program by said receiving processing unit when said transfer of said service process is complete:

executing the service process by said available processing unit; and resuming execution of said lower priority program by said available processing unit when execution of said service process is complete.

7. The method according to claim 6 wherein the invoking step includes additional steps of:

determining a minimum system-side context needed to identify a type and priority of said service to be processed:

generating program code to perform said service process using said minimum system-side context; and storing said generated program code in a predetermined storage location.

8. The method according to claim 7 wherein the executing step includes the steps of:

storing a minimum system-side context of said lower priority program being executed by said available processing unit as determined by the determining step of said invoking step; and loading a minimum system-side context of said service process; and wherein the resuming step includes a step of retrieving the minimum system-side context of the lower priority program.

9. The method according to claim 6 wherein the transferring step includes the steps of:

comparing the priority level of said service to be processed to priority levels of programs being executed on processing units of the system; and designating as said available processing unit a processing unit in said system which is processing a lower priority program.

* * * * *